No. 782,462. Patented February 14, 1905.

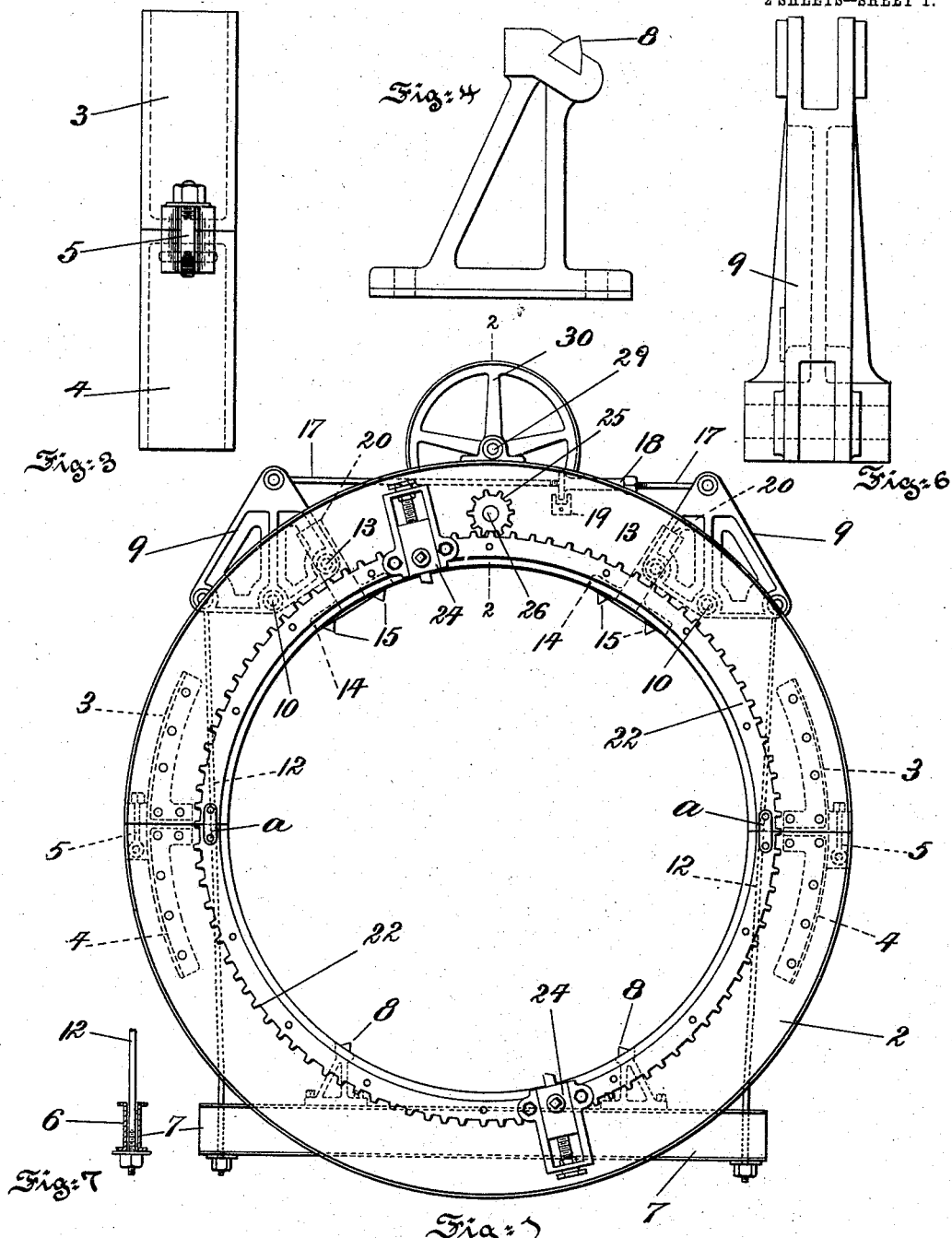

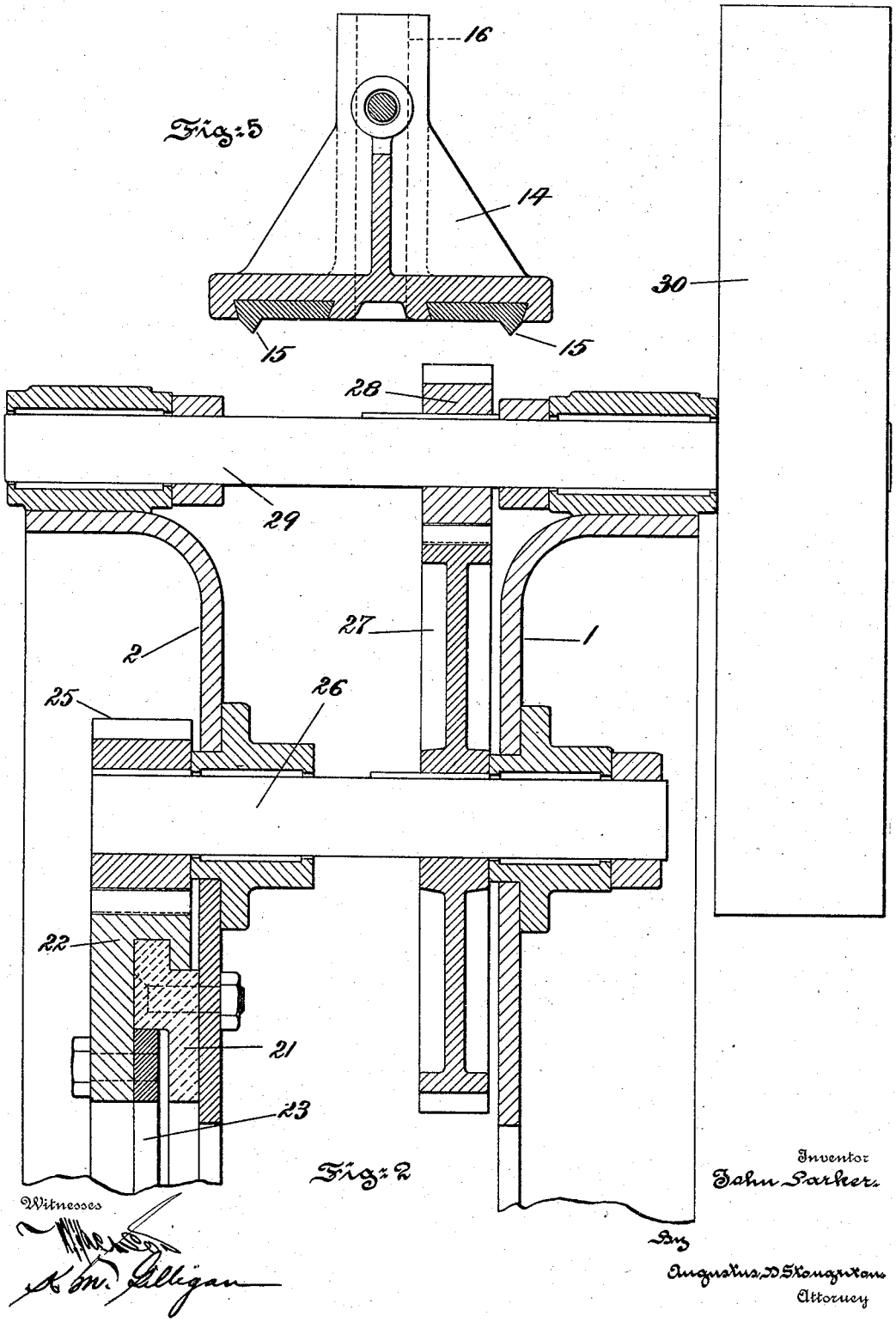

UNITED STATES PATENT OFFICE.

JOHN PARKER, OF PHILADELPHIA, PENNSYLVANIA.

PIPE-CUTTING MACHINE.

SPECIFICATION forming part of Letters Patent No. 782,462, dated February 14, 1905.

Application filed April 6, 1904. Serial No. 201,819.

*To all whom it may concern:*

Be it known that I, JOHN PARKER, a subject of the King of Great Britain, and a resident of Philadelphia, in the county of Philadelphia and State of Pennsylvania, have invented a certain new and useful Pipe-Cutting Machine, of which the following is a specification.

One object of the present invention is to provide a convenient, strong, light, and comparatively inexpensive machine for cutting pipes.

Another object of the invention is to simplify and improve the mechanism by means of which power is applied to the working parts of the machine; and another object of the invention is to provide for satisfactorily and expeditiously cutting pipes, even of relatively large diameters.

Other objects of the invention will appear from the following description; and the invention itself consists of the improvements to be presently described and finally claimed.

The nature, characteristic features, and scope of the invention will be more fully understood from the following description, taken in connection with the accompanying drawings, forming part hereof, and in which—

Figure 1 is a front view of a machine embodying features of the invention. Fig. 2 is a view drawn to an enlarged scale and taken principally in section upon the line 2 2 of Fig. 1. Fig. 3 is an edge view, drawn to an enlarged scale, of one of the couplings shown in Fig. 1. Fig. 4 is a side view of one of the jaws shown at the lower portion of Fig. 1. Fig. 5 is a view, partly in section, of one of the jaws shown at the upper portion of Fig. 1. Fig. 6 is an edge view of one of the bell-crank levers shown in Fig. 1; and Fig. 7 is a view, partly in section, illustrating a detail of construction.

1 and 2 are annular flanged heads shown as arranged with their flanges projecting outward and with their faces arranged with some space between them. Each of these heads is made in two parts, so that they are semicircular, in order that they may be applied to and removed from a pipe in cases where it is not convenient to apply the machine by applying them over the end of the pipe.

3 and 4 are parts of a coupling, and they are respectively connected with two of the semicircular flanged heads and serve as distance-pieces between them. One part, 4, of the coupling is shown as provided with a pivotal bolt 5 and the other part with a jaw for receiving and releasing the bolt, and which jaw is engaged and disengaged by the nut of the bolt. The described coupling constitutes convenient means for detachably connecting the two parts of the ring, which consists of the semicircular flanged heads. In use the ring is to be clamped securely to the pipe, and for this purpose the following mechanism is provided: There are a pair of channel-beams 6 and 7, arranged between the annular heads 1 and 2, and to these beams are secured spurs 8. Near the top and between the heads 1 and 2 are arranged bell-crank levers 9, pivoted at 10— for example, by means of pivots connected with the parts 1 and 2. Links 12 connect the bell-crank levers with the beam which carries the jaws 8. As shown, these links pass between the beams 6 and 7 and are provided at their ends with nuts, which afford means of adjustment. The bell-crank levers 9 have pivotally connected with them, as at 13, the jaws 14, Fig. 5, which are fitted with spurs 15 and with lateral grooves 16.

17 is a tie-rod provided with a turnbuckle 18 and connected with each of the bell-cranks. The turnbuckle is held so as to revolve, but not move endwise, by means of a holder 19, arranged between and secured to the parts 1 and 2. The turnbuckle is also shown as squared for the reception of a wrench. Upon turning the turnbuckle the two parts of the link 17 are drawn together or apart by reason of the right and left handed screw connection which they have with it. Thus the bell-cranks are turned and caused to shift the various parts, so that the spurs 8 and 15 are made to engage or disengage the pipe, as required.

20 represents rods or bars connected with the parts 1 and 2 and arranged to guide the jaws 14 by reason of the grooves 16, which are arranged for the reception of the bars. Upon the face of the part 2 is secured a two-part circular ring 21. Upon this guide-ring 21 is arranged so as to rotate a two-part toothed wheel or hoop 22. To this wheel there is bolted a two-part locking-ring 23, so that when assembled the parts occupy the position shown in Fig. 2.

The parts of the toothed wheel 22 and of the locking-ring come apart with the sections of the head when the latter are separated by the proper manipulation of the coupling in order to apply them to or remove them from a pipe when it is not desirable to apply the whole device by inserting the pipe through it or passing it over the pipe. If desired, use may be made of catches $a$ at the joints of the tooth-ring for insuring proper pitch of its teeth. The toothed wheel 22 is provided with tool-stocks 24, which carry adjustable cutting-tools. 25 is a pinion meshing with the toothed wheel 22 and keyed to a shaft 26, journaled between the parts 1 and 2. This shaft is turned in some convenient way, and it serves to impart rotary motion to the toothed wheel 22 and to the tool-stocks in respect to the annular flanged heads 1 and 2, which are clamped to the pipe, and in this way the pipe is cut. As shown, the shaft 26 has keyed upon it a gear-wheel 27, which meshes with a pinion 28, keyed to a power-shaft 29, journaled between the parts 1 and 2 and provided with a pulley 30, which, however, may be replaced by a crank or other suitable device for turning it.

Modifications may be made in details without departing from the spirit of the invention; but,

Having thus described the nature and objects of my invention, what I claim as new, and desire to secure by Letters Patent, is—

1. A pipe-cutter consisting of the combination of a pair of annular outwardly-flanged heads, spurs arranged between the inner faces of the heads, mechanism arranged between the inner faces of the heads for shifting the spurs in a generally radially direction, a toothed hoop provided with cutters and rotatably mounted on the outer face of one of the heads, a pinion meshing with said hoop, and means between the inner faces of the heads for turning the pinion, substantially as described.

2. In a pipe-cutter a ring consisting of annular outwardly-flanged heads connected together, in combination with means for clamping it, cutters, and devices for operating the cutters, substantially as described.

3. In a pipe-cutter the combination of a pair of couplings, semicircular outwardly-flanged heads arranged upon opposite sides of and connected with the respective members of the couplings, clamping devices, cutters, and means for operating the cutters, substantially as described.

4. In a pipe-cutter the combination of a pair of annular outwardly-flanged heads connected together with a space between them, spurs arranged in said space, mechanism arranged between the inner faces of the heads for actuating the spurs, cutters, and means for operating the cutters, substantially as described.

5. In a pipe-cutter the combination of a pair of outwardly-flanged annular heads, a circular guiding-ring secured to the outer face of one of the heads, a sectional toothed hoop engaging the guiding-ring, cutters carried by the hoop, means for rotating the hoop, and a locking-ring detachably secured to the hoop and engaging the guiding-ring whereby the parts may be assembled and disconnected, substantially as described.

6. In a pipe-cutter the combination of cutters, mechanism for actuating the cutters, semicircular flanged heads, couplings having their respective parts interposed between and connected with said heads, bell-crank levers pivoted between said heads and provided with spurs, a beam arranged between said heads and provided with spurs, links connecting the bell-crank levers and beam, a tie-rod provided with a turnbuckle and connected with the bell-cranks, and means for rotatably supporting the turnbuckle and preventing endwise motion thereof, substantially as described.

7. In a pipe-cutter the combination of a pair of outwardly-flanged heads, a toothed hoop rotatably mounted on the outer face of one of said heads and provided with cutters, a crosswise-ranging shaft journaled between said heads and provided with a pinion meshing with said hoop, and means for turning said shaft, substantially as described.

8. In a pipe-cutter the combination of annular outwardly-flanged heads connected together, cutters, means for actuating the cutters, a pair of beams carrying spurs, bell-crank levers and means for actuating them, links connected with the bell-crank levers and arranged between the beams, and nuts applied to the links and upon which the beams rest, substantially as described.

9. A pipe-cutter comprising the combination of a pair of semicircular flanged heads, couplings having their respective members connected with said heads, bell-crank levers pivotally supported between said heads and provided with spurs, a beam arranged between said heads and provided with spurs, links connecting the bell-crank levers and beam, a tie-rod provided with a turnbuckle and connecting the bell-crank levers, a holder for the turnbuckle arranged between the heads, a guide-ring applied to one of the heads, a two-part toothed hoop engaging said guide-ring so as to rotate, cutters carried by the toothed hoop, a locking-ring detachably applied to the hoop and engaging the guide-ring, a shaft arranged between the heads and provided with a pinion engaging said hoop, and gearing arranged between the heads for driving the shaft, substantially as described.

In testimony whereof I have hereunto signed my name.

JOHN PARKER.

In presence of—
W. J. JACKSON,
K. M. GILLIGAN.